Jan. 10, 1928.
J. A. BODKIN
1,655,808
SCREW SPIKE LINER
Filed April 6, 1925
2 Sheets-Sheet 1
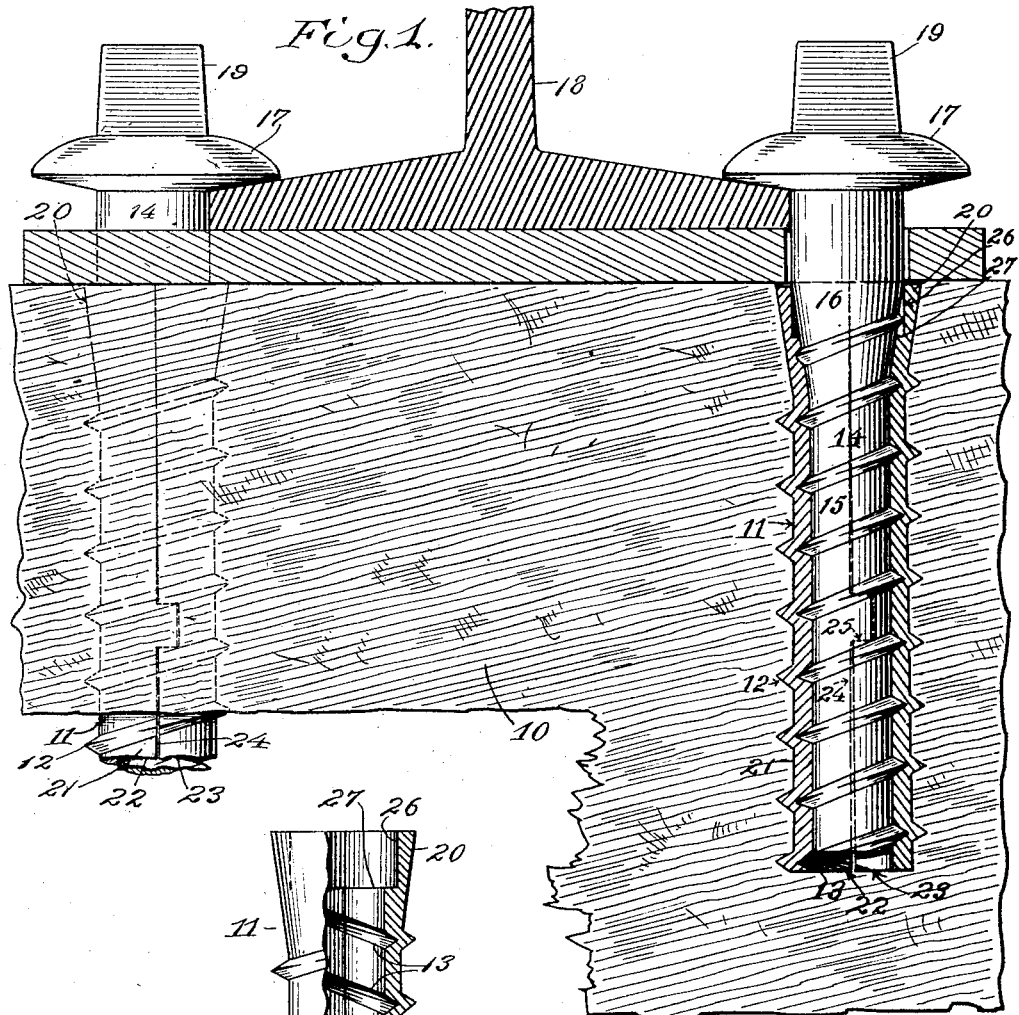
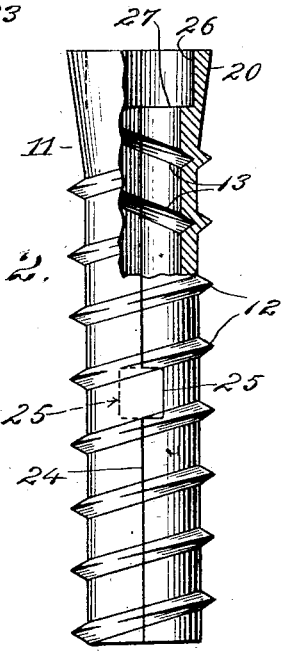
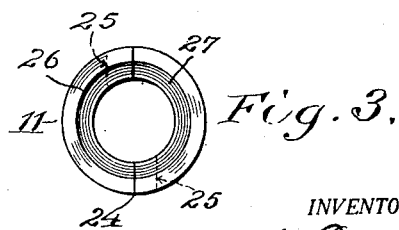
INVENTOR.
John A. Bodkin
BY Conrad A. Dieterich
ATTORNEY.

Jan. 10, 1928.
J. A. BODKIN
1,655,808
SCREW SPIKE LINER
Filed April 6, 1925
2 Sheets-Sheet 2
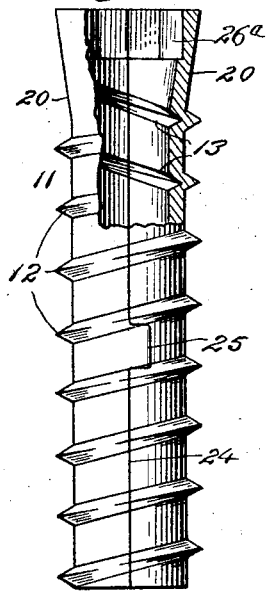
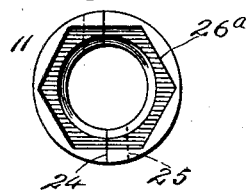
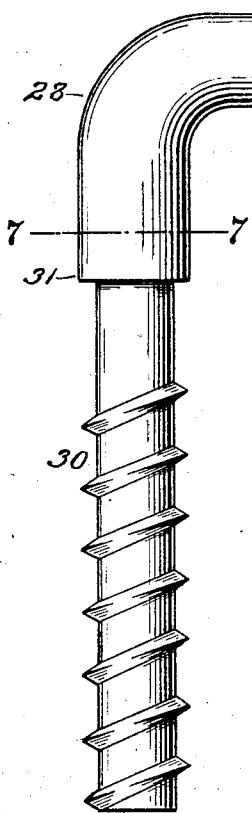
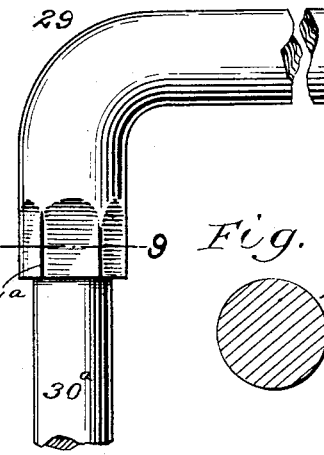
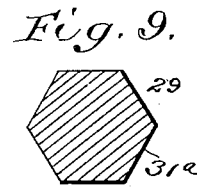
INVENTOR.
John A. Bodkin
BY Conrad A. Dietrich
his ATTORNEY.

Patented Jan. 10, 1928.

1,655,808

UNITED STATES PATENT OFFICE.

JOHN A. BODKIN, OF NEW YORK, N. Y.

SCREW-SPIKE LINER.

Application filed April 6, 1925. Serial No. 21,150.

My invention relates to improvements in means for securing railroad rails or the like in position upon a tie or other support, and the same has for its object more particularly to provide a simple, durable and practical device which may be readily secured to or embedded in a support or tie to receive a fastening member or spike whereby the rail is secured to the support.

Further, said invention has for its object to provide a device of the character specified which is adapted to be firmly embedded or secured within a support of yieldable material and to receive and firmly hold a fastening member or element in such manner as to permit of the repeated removal and replacement of said member without damaging or injuring said support.

Further, said invention has for its object to provide a device of the character specified which may, by the application of suitable tools thereto, be readily and firmly anchored or secured within a support.

Further, said invention has for its object to provide a device of the character specified which is exteriorly threaded to permit of its ready introduction into a support, and of its securement therein, and in which the exteriorly threaded parts are adapted to be expanded into gripping engagement with the surrounding material upon disposition of a member or element within said liner.

Further, said invention has for its object to provide a liner or sleeve which consists of separate longitudinal sections to permit the ready association thereof with a tool in positioning of the same, and to permit of the expansion thereof into firm engagement with the support upon disposition of the fastening member or element within the liner.

Further, said invention has for its object to provide a liner or sleeve which is exteriorly and interiorly threaded and which consists of separate longitudinal sections so associated as to permit the ready securement of the liner within the support therefor, and the disposition of a threaded member within the liner to expand the same into gripping engagement with the support whereby firmly to hold said member within said liner.

Further, said invention has for its object to provide a liner or sleeve of the character specified consisting of a plurality of cooperating longitudinal sections held against longitudinal movement relative to each other, and adapted to receive intermediate its said sections a securing member which serves also to expand said sections into gripping engagement with the surrounding material of said support.

Other objects will in part be obvious and in part be pointed out hereinafter.

To the attainment of the aforesaid objects and ends, my invention consists in the novel details of construction, and in the combination, connection and arrangement of parts hereinafter more fully described and then pointed out in the claims.

In the accompanying drawings showing an illustrative embodiment of the invention, Figure 1 is a sectional elevation showing one form of device constructed according to and embodying my said invention, the same being shown in position within its support with the fastening member or spike disposed therein;

Fig. 2 is a side elevation of the liner partly broken away and in section;

Fig. 3 is a top view thereof;

Fig. 4 is a side elevation of a slightly modified form of liner partly broken away and in section;

Fig. 5 is a top view thereof;

Fig. 6 is a side view of a tool or wrench employed to permanently position in its support the liner shown at Figs. 1 to 3;

Fig. 7 is a sectional view thereof on the line 7—7 of Fig. 6;

Fig. 8 is a side view of a tool or wrench employed to insert and remove the liner shown at Figs. 4 and 5 into and from its support, and Fig. 9 is a sectional view thereof on the line 9—9 of Fig. 8.

In said drawings the support or tie 10 has embedded or secured therein a socket or sleeve 11 provided with the exteriorly arranged projecting threads 12 which serve to permit ready disposition of the sleeve 11 within the support 10 and to provide anchoring or gripping elements biting into the yieldable material of the support to firmly hold and retain the liner therein.

The interior surface of the liner 11 is provided with threads 13 (shown as spiral grooves) to permit the fastening member 14 to be screwed into the same. The member 14 is illustrated as one form of railway screw spike comprising a threaded shank portion 15 of substantially uniform cross section, a tapered intermediate portion 16, a head 17 adapted to engage the rail 18 to retain the same against the support 10 and a polygonal end 19 adapted to be engaged by a wrench to screw or turn down said spike 14 into the liner or sleeve 11. The sleeve or liner embodying my invention may be designed to receive fastening members of different types or shapes.

The upper end 20 of the sleeve 11 is enlarged or diverges to conform with the tapered portion 16 of the spike to limit the downward movement thereof into the liner 11. The lower threaded portion 21 of the sleeve 11 is of a substantially uniform cross section, and has its interior portion tapered slightly towards its lower end to provide a bore therein of a diameter slightly less than the diameter of the shank 15 of the member 14 for a purpose hereinafter more fully described.

The sleeve 11 is composed of two separate longitudinal parts or sections 22 and 23 engaging each other along the longitudinal edges 24, and provided with interengaging means 25 at opposite sides thereof to prevent relative longitudinal movement of the parts when assembled. The means 25 consists of tongues projecting from certain edges of the sections and extending into cooperating recesses at the opposing edges of the sections.

The enlarged portion 20 of the sleeve 11 has an interior tool receiving recess or socket 26 therein forming an abutment or ledge 27 adapted to be engaged by the tool.

In the form of sleeve illustrated at Figs. 1 to 3 the recess 26 is cylindrical in cross section, and in the form illustrated at Figs. 4 and 5 the recess 26$^a$ is polygonal in cross section.

The first mentioned form of sleeve is adapted to be permanently or non-removably secured within the support 10 by means of the tool or wrench 28 illustrated at Figs. 6 and 7. The second mentioned form of sleeve which is removable is secured in position and removed by means of the tool or wrench 29 illustrated in Figs. 8 and 9.

The wrench 28 comprises a threaded shank 30 of uniform diameter adapted to fit into the interiorly threaded portion of the sleeve 11, and an enlarged cylindrical portion or shoulder 31 adapted to fit into the cylindrical recess 26 and engage the abutment 27. A crank 32 is provided for rotating the tool.

The wrench 29 has a reduced unthreaded shank 30$^a$ of uniform diameter adapted to fit into the interiorly threaded portion of the sleeve 11, and a polygonal portion or shoulder 31$^a$ conforming in shape with that of the recess 26$^a$ and adapted to fit therein. The wrench 29 is likewise provided with a crank 32$^a$.

To position the sleeve, a hole is first bored in the support 10 and, in some cases, as when the wood or material is unusually hard, a thread may be formed therein. To insert the first form of sleeve into the hole the two sections 22 and 23 thereof are placed on the shank of the tool 28 with the threads thereof meshing with the threads 13 of the liner, the several means 25 interengaging. The sleeve 11 is then screwed into the hole by rotating handle or crank 32. The sleeve 11, after any relative movement of the wrench 28 therein ceases, is forced into the hole and then retained securely in position therein. The wrench 28 is removed by rotating the same in the reverse direction.

The removable type of sleeve 11, Figs. 4 and 5, is, in like manner, secured within the hole of the support 10 by fitting the polygonal shoulder 31$^a$ of the tool 29 into the correspondingly shaped recess 26$^a$ and rotating the tool. The recess 26$^a$ and tool 29, owing to the polygonal contours thereof, are adapted to permit of the removal of the sleeve when desired.

The threaded spike 14 is screwed into the sleeve 11 by the rotation of a suitable tool applied to the polygonal end 19 thereof. The shank 15 of the spike by its engagement with the lower portions of the sections 22 and 23 serves to spread or expand the same and force the exterior threads 12 of the sleeve 11 firmly into gripping engagement with the material of the support 10, and hold the spike firmly in position within the sleeve.

My invention is especially valuable on railway lines having heavy traffic and sharp curves, requiring frequent replacement or renewal of the rails. When my invention is utilized the screw spikes can be repeatedly removed and replaced without injuring the fibre of the wood, and thus avoiding the weaking or destruction of the support by repeatedly making holes therein. The sleeve embodying my said invention also affords a firmer hold for the spike than when the same is directly embedded in the wood.

Having thus described my said invention, what I claim and desire to secure by Letters Patent is:—

1. A device of the character described comprising an expansible, tubular socket member having correspondingly inclined threads upon the inner and outer surfaces thereof; said socket member having a tool receiving recess therein at an end to permit of the rotation thereof to secure the same within a support therefor, substantially as specified.

2. A device of the character described comprising an exteriorly threaded, tubular socket member consisting of a plurality of separate longitudinal sections having a tool receiving recess at one end formed partly on each of said sections, substantially as specified.

3. A device of the character described comprising an interiorly and exteriorly threaded, tubular socket member having an enlarged recess therein at one end, and an interior portion tapering towards the opposite end; said socket member including separate longitudinal sections, and interengaging means to prevent relative longitudinal movement of said sections when assembled; said sections being adapted to receive a tool therebetween and within said recessed portion to permit of the rotation of said socket member to secure the same within a support therefor and being adapted to receive a threaded member cooperating with said tapered portion to expand said sections into engagement with said support, substantially as specified.

4. A device of the character described comprising a substantially cylindrical socket member including separate longitudinal sections, and interengaging means to prevent relative longitudinal movement of said sections, and correspondingly inclined threads of uniform depth disposed uniformly substantially throughout the entire length of the inner and outer surfaces of said socket member; said socket member being provided at the upper end thereof with a recess for receiving a tool to permit of the rotation of said socket member to secure the same within a support, and adapted to receive a threaded member for expanding said sections into engagement with said support and to secure an object in position upon said support, substantially as specified.

5. A device of the character described comprising an exteriorly and interiorly threaded, tubular socket member composed of a plurality of separate longitudinal sections having interengaging portions to prevent relative movement thereof; said socket member having a tool receiving recess at one end, and an interior wall portion tapering towards the opposite end, substantially as specified.

Signed at the city of New York, borough of Manhattan, in the county and State of New York, this 21st day of March, one thousand nine hundred and twenty-four.

JOHN A. BODKIN.